(12) United States Patent
Gallagher

(10) Patent No.: US 6,818,165 B2
(45) Date of Patent: Nov. 16, 2004

(54) METHOD OF FABRICATING FLUID FLOW FIELD PLATES

(75) Inventor: Emerson R. Gallagher, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 332 days.

(21) Appl. No.: 10/082,545

(22) Filed: Feb. 25, 2002

(65) Prior Publication Data

US 2003/0160357 A1 Aug. 28, 2003

(51) Int. Cl.$^7$ .......................... B29C 59/02; B29C 59/04
(52) U.S. Cl. .................. 264/104; 264/105; 264/137; 264/160; 264/163; 264/284; 264/293
(58) Field of Search ................. 264/104, 105, 264/137, 160, 163, 284, 293

(56) References Cited

U.S. PATENT DOCUMENTS

| | | | |
|---|---|---|---|
| 5,521,018 A | 5/1996 | Wilkinson et al. | 42/26 |
| 5,527,363 A | 6/1996 | Wilkinson et al. | 29/623.1 |
| 5,804,116 A | * 9/1998 | Schmid et al. | 264/104 |
| 6,649,102 B2 | * 11/2003 | Davis et al. | 264/163 |

FOREIGN PATENT DOCUMENTS

| | | |
|---|---|---|
| DE | 10015360 A1 | 10/2001 |
| EP | 1184923 A2 | 3/2002 |
| JP | 07-161366 A | 6/1995 |
| WO | WO 96/37005 A1 | 11/1996 |
| WO | WO 00/41260 | 7/2000 |
| WO | WO 01/37362 | 5/2001 |

* cited by examiner

*Primary Examiner*—Leo B. Tentoni
(74) *Attorney, Agent, or Firm*—McAndrews, Held & Malloy, Ltd.

(57) ABSTRACT

A method fabricates fluid flow field plates that are suitable for use in an electrochemical fuel cell assembly. Pursuant to the method, a fluid flow field channel region such as, for example, substantially straight, parallel fluid flow field channels, is roller embossed in a sheet of compressible, electrically conductive material such as, for example, expanded graphite sheet material. A fluid distribution region such as, for example, a region containing manifold openings and supply channels, is then reciprocally embossed in the sheet material. A sheet pre-impregnated with a curable polymeric composition, such as pre-impregnated expanded graphite, can be employed, with the curing step being performed after the roller embossing and reciprocal embossing steps.

27 Claims, 16 Drawing Sheets

METHOD OF FABRICATING FLUID FLOW FIELD PLATES

FIELD OF THE INVENTION

The present invention relates to electrochemical fuel cells. More particularly, the present invention relates to fluid flow field plates and to a method of fabricating such plates.

BACKGROUND OF THE INVENTION

Electrochemical fuel cell assemblies convert reactants, namely fuel and oxidant, to generate electric power and reaction products. Electrochemical fuel cell assemblies generally employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cell assemblies typically employ a membrane electrode assembly ("MEA") consisting of a solid polymer electrolyte, or ion exchange membrane, disposed between two electrode layers. The membrane, in addition to being ion conductive (typically proton conductive) material, also acts as a barrier for isolating the reactant (that is, fuel and oxidant) streams from each other.

The MEA is typically interposed between two separator plates, which are substantially impermeable to the reactant fluid streams, to form a fuel cell assembly. The plates act as current collectors, provide support for the adjacent electrodes, and typically contain fluid flow field channels for supplying reactants to the MEA or for circulating coolant. The plates are typically referred to as fluid flow field plates. The fuel cell assembly is typically compressed to promote effective electrical contact between the plates and the electrodes, as well as effective sealing between fuel cell components. A plurality of fuel cell assemblies may be combined electrically, in series or in parallel, to form a fuel cell stack. In a fuel cell stack, a plate can be shared between two adjacent fuel cell assemblies, in which case the plate also separates the fluid streams of the two adjacent fuel cell assemblies. Such plates are commonly referred to as bipolar plates and may have flow channels formed therein for directing fuel and oxidant, or a reactant and coolant, on each major surface, respectively.

The fuel stream that is supplied to the anode typically comprises hydrogen. For example, the fuel stream may be a gas such as substantially pure hydrogen or a reformate stream containing hydrogen. Alternatively, a liquid fuel stream such as aqueous methanol may be employed.

The oxidant stream, which is supplied to the cathode, typically comprises oxygen, such as substantially pure oxygen or a dilute oxygen stream such as air.

The electrochemical reactions in a solid polymer fuel cell are generally exothermic. Accordingly, a coolant is typically also employed to control the temperature within a fuel cell assembly. Conventional fuel cells employ a liquid, such as, for example, water, to act as a coolant. In conventional fuel cells, the coolant stream is fluidly isolated from the reactant streams.

Fluid isolation is important for several reasons. For example, one reason for fluidly isolating the fuel and oxidant streams in a hydrogen-oxygen fuel cell is the reactivity of hydrogen and oxygen with each other. The MEA and separator plates are, therefore, substantially impermeable to hydrogen and oxygen. However, since the MEA also functions as an electrolyte, the membrane is generally permeable to protons and water (water is generally required for proton transport in membrane electrolytes).

Fluid flow field plates are generally formed from a suitable electrically conductive material. Furthermore, as indicated above, fluid flow field plates are typically made of a substantially fluid impermeable material (that is, a material sufficiently impervious to typical fuel cell reactants and coolants to fluidly isolate the fuel, oxidant and coolant fluid streams from each other). Expanded graphite, also known as flexible graphite, is a material that is employed in the manufacture of fluid flow field plates. Furthermore, because expanded graphite is a compressible material, an embossing process, such as roller embossing or reciprocal (also know as stamp) embossing, may be employed.

When compared with conventional engraving or milling methods, embossing processes typically provide cost and speed advantages. Embossing processes also typically minimize part handling, thereby making them better suited for mass production. Conventional embossing processes, more specifically reciprocal embossing and roller embossing, present different relative shortcomings with respect to one another.

Improved tolerances are typically achieved by reciprocal embossing. Indeed, the raw material fed into a reciprocal embossing apparatus (typically in the form of discrete sheets) can typically be thicker than the raw material fed into a roller embossing apparatus (typically in the form of rolled sheet material). The ability to work with a thicker piece of material generally results in improved accuracy, including achievement of dimensional tolerances and repeatability, in the mass fabrication of fluid flow field plates. In the production of elongated fluid flow field plates, however, which typically comprise substantially straight (that is, linearly extending), parallel channels extending between fluid distribution regions located at opposite ends of each fluid flow field plate (also referred to as header regions), the thickness of such an elongated plate as well as the parallelism of its channels over the plate's entire length are more easily controlled by roller embossing.

On the other hand, reciprocal embossing is typically a slower and more expensive process than roller embossing. Indeed, reciprocal embossing typically involves higher tonnage equipment than roller embossing. Reciprocal embossing typically includes a pre-stamping requirement for removing air from the material to be embossed; such a pre-stamping requirement is typically not associated with roller embossing. Roller embossing also typically allows continuous processing of material to and/or from the equipment involved, and allows for continuous cleaning of embossing teeth; conversely, reciprocal embossing typically requires temporary interruptions of the processing of material to and/or from the equipment involved, both to allow for embossing and to allow for the cleaning of embossing teeth.

In light of the foregoing, roller embossing has at times been the preferred embossing process for the mass production of fluid flow field plates, especially the mass production of elongated fluid flow field plates. However, the roller embossing process does suffer from particular shortcomings.

Expanded graphite material with a suitable degree of flowability is typically used during a roller embossing process. As the expanded graphite material is extruded from the rolling dies, however, variations in plate length typically result. In order to account for the anticipated extrusion, difficult and expensive adjustments often need to be implemented. The expanded graphite material would typically be post-impregnated (that is, the material is impregnated after it has been embossed) with a curable polymeric composition or material (such as methacrylate), and then cured by conventional means (such as heating or radiation) in order to, among other things, improve the plates' mechanical characteristics. A pre-impregnated material (that is, the material is impregnated before it has been embossed) is typically not employed because of the resultant increase in the number of variables that can detrimentally affect anticipated extrusion. Indeed, employing a pre-impregnated material, as opposed to a post-impregnated material, would typically increase the difficulty and expense of the adjustments needed to account for the anticipated extrusion.

For example, with respect to elongated fluid flow field plates that include substantially straight, parallel channels extending between fluid distribution regions located at opposite ends of each fluid flow field plate, the rolling dies include embossing teeth, which emboss the channels, and special inserts, which are incorporated into the rolling dies to form the fluid distribution regions. The position of the special inserts on the rolling dies need typically to be pre-corrected to account for the anticipated extrusion. As the anticipated extrusion may vary between batches of raw material fed into the roller embossing apparatus, the pre-correction step can result in a process that is difficult and expensive to implement, as the inserts may need to be removed and re-positioned a number of times on the surface of the rolling dies during production.

Another shortcoming of conventional roller embossing techniques is the introduction of residual stresses in certain areas of the fluid flow field plates, more specifically around transitional areas where the fluid flow field plates changes from one cross-sectional profile to another.

For example, with respect to elongated fluid flow field plates comprising substantially straight, parallel channels extending between fluid distribution regions located at opposite ends of each fluid flow field plate, residual stresses are typically introduced around areas of transition between the fluid flow field channels and the fluid distribution regions. These residual stresses often result in warping and/or breaking of the fluid flow field plates around such transitional regions, thereby leading to higher than desired rejections for a mass production process.

Accordingly, there is a general need for a method of mass production of fluid flow field plates that addresses the above-noted shortcomings. The present method overcomes such shortcomings, and provides further related advantages.

SUMMARY OF THE INVENTION

A method of fabricating a fluid flow field plate, which is suitable for use in an electrochemical fuel cell assembly, comprises (a) roller embossing a first embossed pattern in a sheet of compressible, electrically conductive material, and then (b) reciprocal embossing a second embossed pattern in the sheet.

The first embossed pattern can comprise a fluid flow field channel region. In one embodiment, the first embossed pattern comprises fluid flow field channels, more specifically substantially straight, parallel fluid flow field channels.

The second embossed pattern can comprise a fluid distribution region. In one embodiment, the second embossed pattern comprises manifold openings and supply channels.

The sheet material can be pre-impregnated with a curable polymeric composition, with the method further comprising a step of curing the pre-impregnated sheet material. Pursuant to the present method, the curing step is performed after the roller embossing and the reciprocal embossing steps. In one embodiment, the sheet material is pre-impregnated with expanded graphite.

The reciprocal embossing step can comprise simultaneously reciprocally embossing a first fluid distribution region of one fluid flow field plate and a second fluid distribution region of another fluid flow field plate. In one embodiment, the reciprocal embossing step comprises simultaneously reciprocally embossing a first set of manifold openings and supply channels of one fluid flow field plate and a second set of manifold openings and supply channels of another fluid flow field plate.

The reciprocal embossing step can further comprise cutting the sheet between the first fluid distribution region of the one fluid flow field plate and the second fluid distribution region of the other fluid flow field plate.

The reciprocal embossing step can be performed at preset length intervals of the roller embossed sheet material, the preset length equal to the desired length of the fluid flow field plate.

Specific details of certain embodiment(s) of the present method are set forth in the detailed description below to provide an understanding of such embodiment(s). Persons skilled in the technology involved here will understand, however, that the present method has additional embodiments, and/or may be practiced without at least some of the details set forth in the following description of preferred embodiment(s).

DETAILED DESCRIPTION OF PREFERRED EMBODIMENT(S)

The following paragraphs describe embodiment(s) of the present method of fabricating fluid flow field plates that are suitable for use in electrochemical fuel cell assemblies.

Figure 1A:
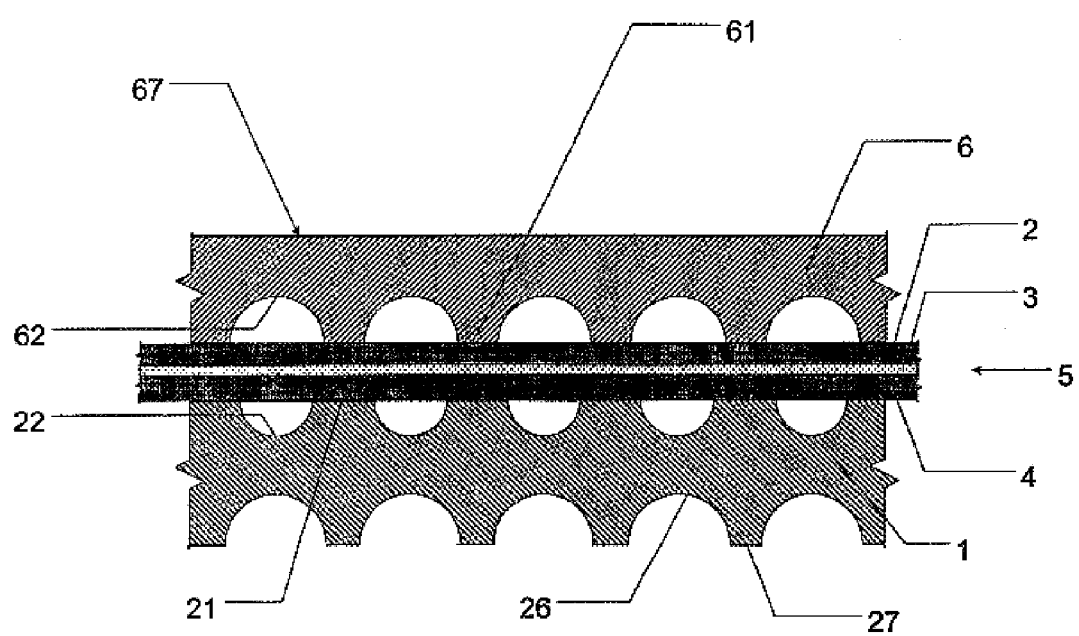
FIG. 1A is a cross-sectional view of a solid polymer fuel cell assembly.
Figure 1B:
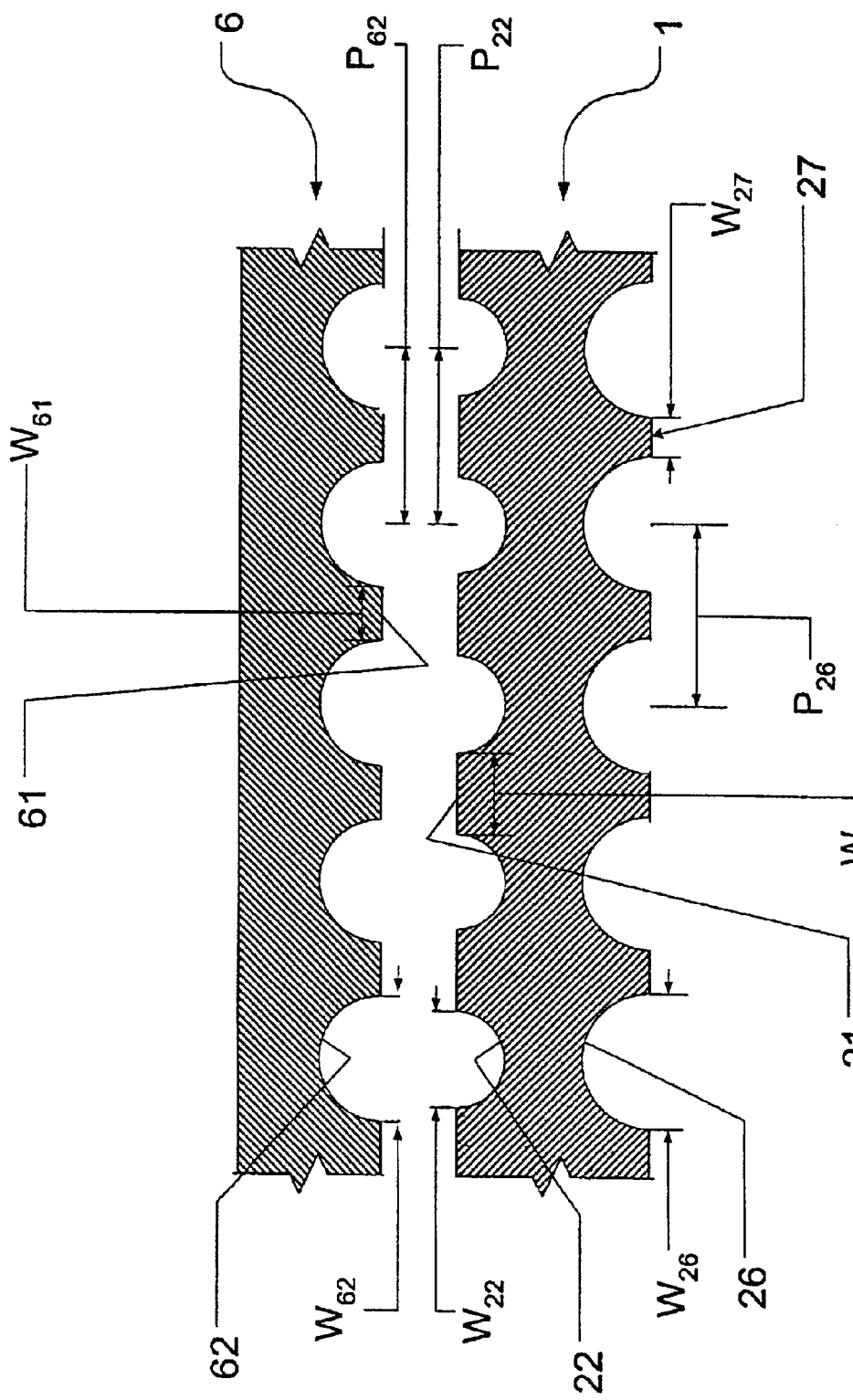
FIG. 1B is a cross-sectional view of the fluid flow field plates of the fuel cell assembly of FIG. 1A.

FIG. 1A illustrates a partial cross-sectional view of a solid polymer fuel cell assembly. MEA 5 comprises a cathode 2, an anode 4 and a solid electrolyte 3 interposed therebetween. MEA 5 is interposed between a fuel flow field plate 1 and an oxidant flow field plate 6. Oxidant stream is supplied to cathode 2 via a number of oxidant channels 62 (in oxidant flow field plate 6), with oxidant channel lands 61 interposed therebetween. Fuel stream is supplied to anode 4 via fuel channels 22 (in fuel flow field plate 1), with fuel channel lands 21 interposed there-between. Coolant stream flows through coolant channels 26 (in fuel flow field plate 1), with coolant channel lands 27 interposed there-between. Whereas open-faced oxidant channels 62 and fuel channels 22 fit against MEA 5 to form complete channels, coolant channels 26 typically fit against a non-active surface 67 of an adjacent oxidant flow field plate to form complete channels. FIG. 1B, which will be referred to below, illustrates a partial cross-sectional view of fuel flow field plate 1 and oxidant flow field plate 6.

Figure 2A:
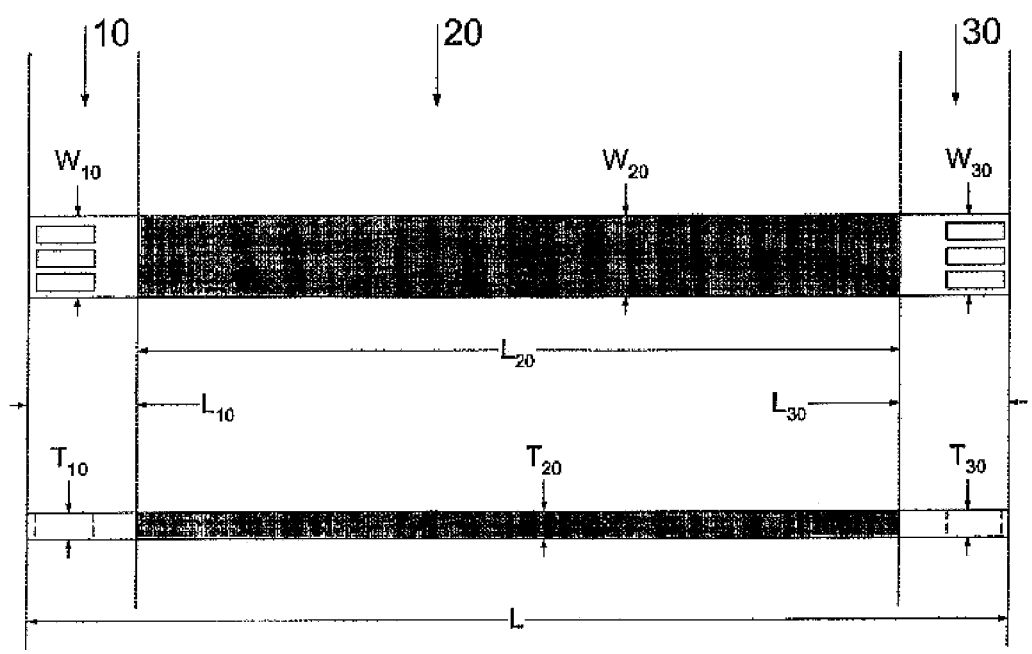
FIG. 2A shows a top view and a side view of a schematic representation of a fluid flow field plate that can be fabricated pursuant to the present method.
Figure 2B:
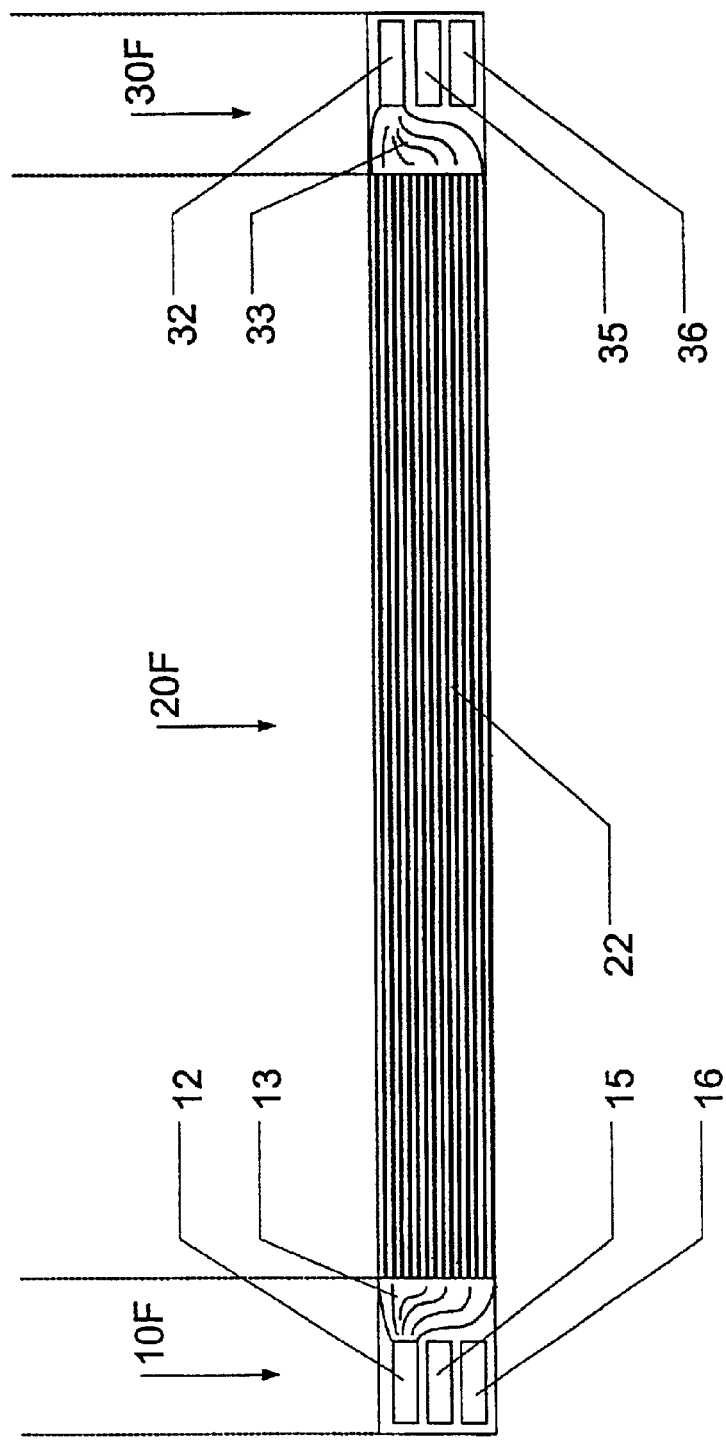
FIGS. 2B, 2C and 2D are more detailed views of the fluid flow field plate of FIG. 2A.
Figure 2C:
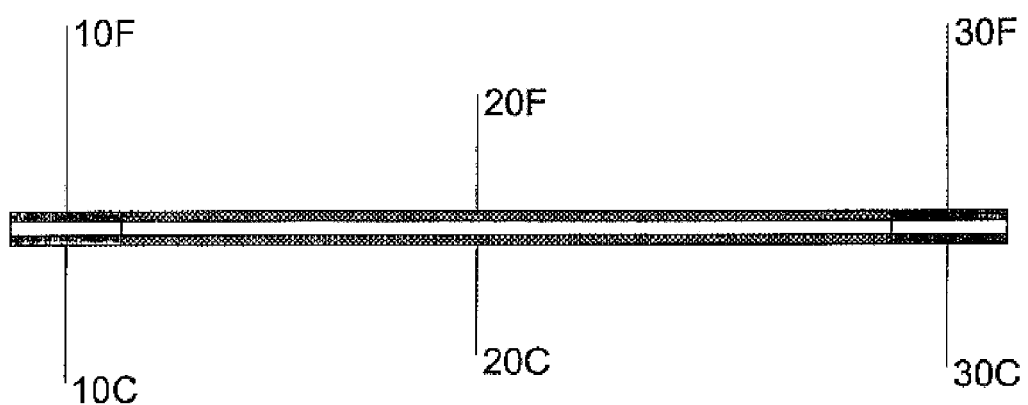
Figure 2D:
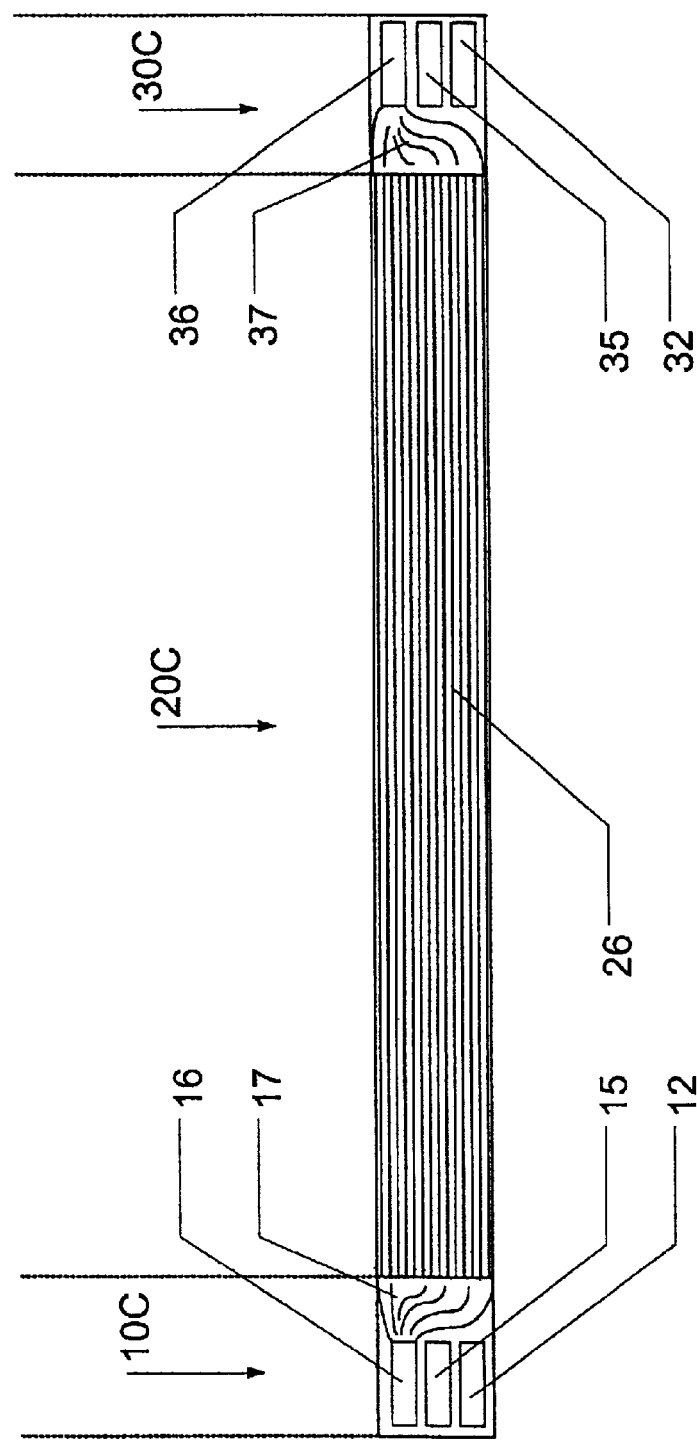

FIGS. 2A, 2B, 2C and 2D are various views of fuel flow field plate 1. FIG. 2A shows a top view and a side view of a schematic representation of fuel flow field plate 1. FIG. 2B is a more detailed plan view of fuel flow field plate 1, with fuel flow field channels 22 facing upwards. FIG. 2C is a more detailed side view of fuel flow field plate 1. FIG. 2D is a more detailed plan view of fuel flow field plate 1, with coolant flow field channels 26 facing upwards.

As shown in FIG. 2A, fuel flow field plate 1 is schematically divided into three regions: a leading fluid distribution region, in the embodiment shown as leading header region 10, a fluid flow field channel region 20 and a trailing fluid distribution region, in the embodiment shown as trailing header region 30. Leading header region 10 of fuel flow field plate 1 has a length $L_{10}$, a width $W_{10}$ and a thickness $T_{10}$. Trailing header region 30 of fuel flow field plate 1 has a length $L_{30}$, width $W_{30}$ and a thickness $T_{30}$. Fuel flow field channel region 20 of fuel flow field plate 1 has a length $L_{20}$, width $W_{20}$ and a thickness $T_{20}$. Consequently, fuel flow field plate 1 has a total length L (equal to $L_{10}+L_{20}+L_{30}$). Length $L_{10}$ and length $L_{30}$ are typically approximately equal. Each of leading header region width $W_{10}$ and trailing header region width $W_{30}$ typically do not exceed width $W_{20}$. More specifically, and as shown in FIG. 2A, width parameters $W_{10}$, $W_{20}$ and $W_{30}$ are typically approximately equal. Each of leading header region thickness $T_{10}$ and trailing header region thickness $T_{30}$ typically do not exceed thickness $T_{20}$. More specifically, and as shown in FIG. 2A, thickness parameters $T_{10}$, $T_{20}$ and $T_{30}$ are typically approximately equal.

As shown in FIG. 2B (which is a top view of fuel flow field plate 1, with fuel flow field channel region 20F facing upwards), fuel flow field channels 22 are substantially straight, parallel to one another, and extend between leading header region 10F and trailing header region 30F. Fuel flow field channels 22 have an open width $W_{22}$ and a pitch $P_{22}$ (seen in more detail in FIG. 1B). For a particular pitch value, the greater width $W_{22}$, the smaller is the width $W_{21}$ of fuel channel lands 21. A fuel stream originating from fuel inlet manifold opening 12 is directed via fuel inlet passages 13 to fuel flow field region 20F, more specifically to fuel flow field channels 22; in turn, the fuel stream flows out of fuel flow field region 20F to fuel outlet manifold opening 32 via fuel outlet passages 33. Fuel inlet manifold opening 12 and fuel outlet manifold opening 32 are each fluidly connected to similar manifold openings of fuel and oxidant flow field plates of adjacent fuel cell assemblies.

As shown in FIG. 2D(which is a top view of fuel flow field plate 1, with fuel flow field channel region 20C facing upwards), coolant flow field channels 26 are substantially straight, parallel to one another, and extend between leading header region 10C and trailing header region 30C. Coolant flow field channels 26 have an open width $W_{26}$ and a pitch $P_{26}$ (seen in more details in FIG. 1B). For a particular pitch value, the greater width $W_{26}$, the smaller is the width $W_{27}$ of coolant channel lands 27. A coolant stream originating from coolant inlet manifold opening 16 is directed via coolant inlet passages 17 to coolant flow field region 20C, more specifically to coolant flow field channels 26; in turn, the coolant stream flows out of coolant flow field region 20C to coolant outlet manifold opening 36 via coolant outlet passages 37. Coolant inlet manifold opening 16 and coolant outlet manifold opening 36 are each fluidly connected to similar manifold openings of fuel and oxidant flow field plates of adjacent fuel cell assemblies.

As shown in FIGS. 2B and 2D, oxidant inlet manifold opening 15 and oxidant outlet manifold opening 35 allow an oxidant stream to flow to oxidant channels 62 of adjacent oxidant flow field plates 6.

FIG. 2C is a schematic side view of fuel flow field plate 1, with fuel side facing upwards and coolant side facing downwards. The fuel side comprises leading header region 10F, fuel flow field region 20F and trailing header region 30F. The coolant side comprises leading header region 10C, coolant flow field region 20C and trailing header region 30C. It should be noted that, for purposes of simplicity, FIG. 2C does not explicitly show manifold openings extending through fuel flow field plate 1, but it is to be understood that such openings do extend from one surface to the other.

Figure 3A:
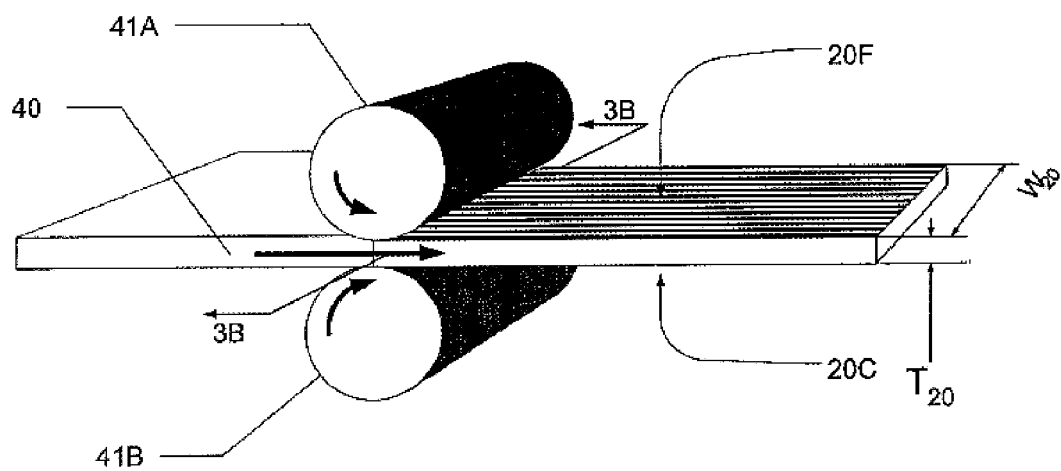
FIG. 3A is a perspective view of a schematic representation of a fluid flow field plate being fabricated pursuant to a roller embossing step of an embodiment of the present method.
Figure 3B:
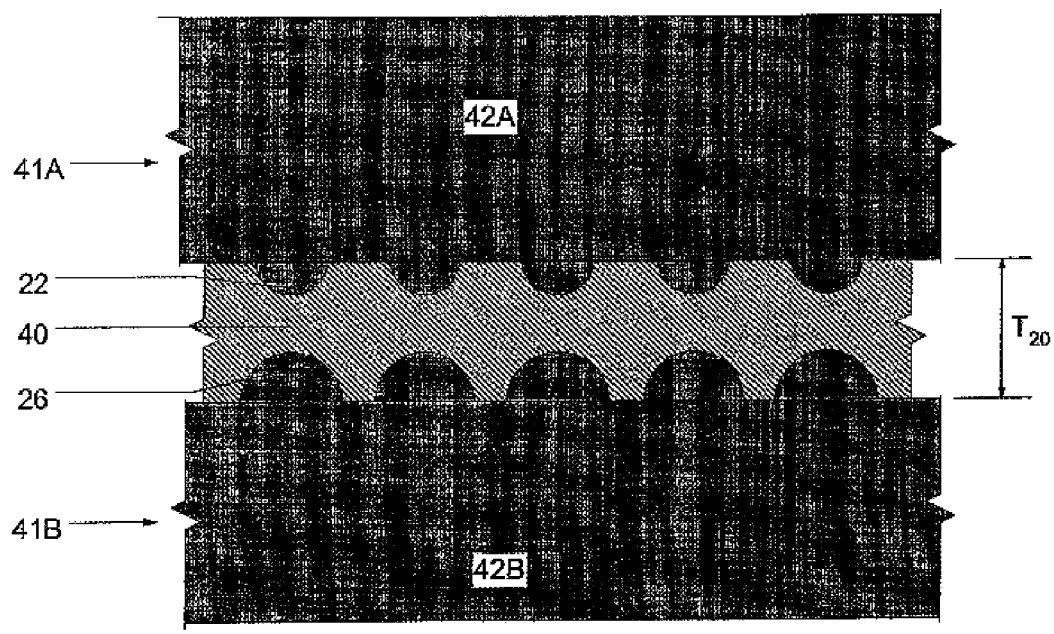
FIG. 3B is a section view along lines 3B-3B of FIG. 3A.

Pursuant to an embodiment of the present method, fluid flow field regions 20F and 20C are fabricated by roller embossing. More specifically, pursuant to an embodiment of the present method as shown in FIGS. 3A and 3B (FIG. 3B being a section view along line 3B-3B of FIG. 3A), sheet of material 40 is fed, from a roll, through a dual-roller embossing apparatus comprising a top roller 41A and a bottom roller 41B. As outlined above, post-impregnated expanded graphite is typically employed (that is, resin impregnation and curing occurring after embossing). In the present embodiment of the method, pre-impregnated expanded graphite is used (that is, resin impregnation occurs before embossing, with curing occurring after embossing). Pre-impregnation tends to give material 40 better flowability characteristics during embossing, thereby resulting in better tolerances being achieved in the fluid flow field plate. As discussed in more detail below, the resultant increase in anticipated extrusion is no longer as problematic as in prior, conventional fluid flow field plate fabrication methods.

The dual-roller embossing apparatus is adapted so as to emboss fuel flow field channel region 20 onto sheet of material 40, more specifically so as to emboss fuel flow field channel region 20F (which comprises fuel flow field channels 22) on one surface and coolant flow field channel region 20C (which comprises coolant flow field channels 26) on the opposite surface. In the present embodiment, this is accomplished by employing rollers 41A and 41B with embossing teeth that emboss the desired profile in sheet 40; more specifically, roller 41A comprises embossing teeth 42A that emboss fuel flow field channels 22 and roller 41B comprises embossing teeth 42B that emboss coolant flow field channels 26.

Because flow field plate thickness parameters $T_{10}$ and $T_{30}$ do not exceed thickness $T_{20}$ (in the plate shown in FIG. 2A, they are the same) and fluid flow field plate width parameters $W_{10}$ and $W_{30}$ do not exceed width $W_{20}$ (in the plate shown in FIG. 2A, the thicknesses are approximately equal), the dual-roller embossing apparatus is also adapted so that sheet 40 is embossed to fluid flow field channel region 20's required thickness $T_{20}$ and width $W_{20}$. Consequently, when sheet 40 emerges from the dual-roller apparatus, it is a sheet of thickness $T_{20}$ and width $W_{20}$, with fuel flow field channels 22 embossed on one side and coolant flow field channels 26 embossed on another.

Pursuant to the present method, header regions 10 and 30 are thereafter subsequently reciprocally (or stamp) embossed and sheet 40 is cut at the appropriate length L (it is to be understood that intermediary step(s) can be performed between the roller and reciprocal embossing steps). More specifically, as will be outlined in more detail below and be shown in FIGS. 4A, 4B and 4C, a reciprocal embossing apparatus simultaneously forms leading header region 10 on one fluid flow field plate and trailing header region 30 on an adjacent fluid flow field plate. Because sheet 40 is embossed twice at certain locations (more specifically, some portions of sheet 40 are first roller embossed with fluid flow field channel region 20 and then subsequently reciprocally embossed with leading header region 10 or trailing header region 30), a material with suitable flowability characteristics, such as pre-impregnated expanded graphite, is employed. A pre-impregnated material can be employed because the present method no longer requires difficult and expensive adjustments to account for anticipated extrusion.

Because the reciprocal embossing step is performed after the roller embossing step, removal of entrapped air in the material, which is typically part of a reciprocal embossing step, is no longer necessary. Indeed, roller embossing of sheet of material 40 increases the density of the material to the point where almost no void or pockets remain. As a result, the reciprocal embossing step does not require the additional step of removal of entrapped air. This has a positive impact on speed of the reciprocal embossing step and, consequently, on overall manufacturing speed of fuel flow field plate 1.

Also, because variation in length of sheet of material 40 tends to occur during the roller embossing step, cutting sheet of material 40 to the precise desired length L after it has been roller embossed, but before it has been cured, is beneficial.

Figure 4A:
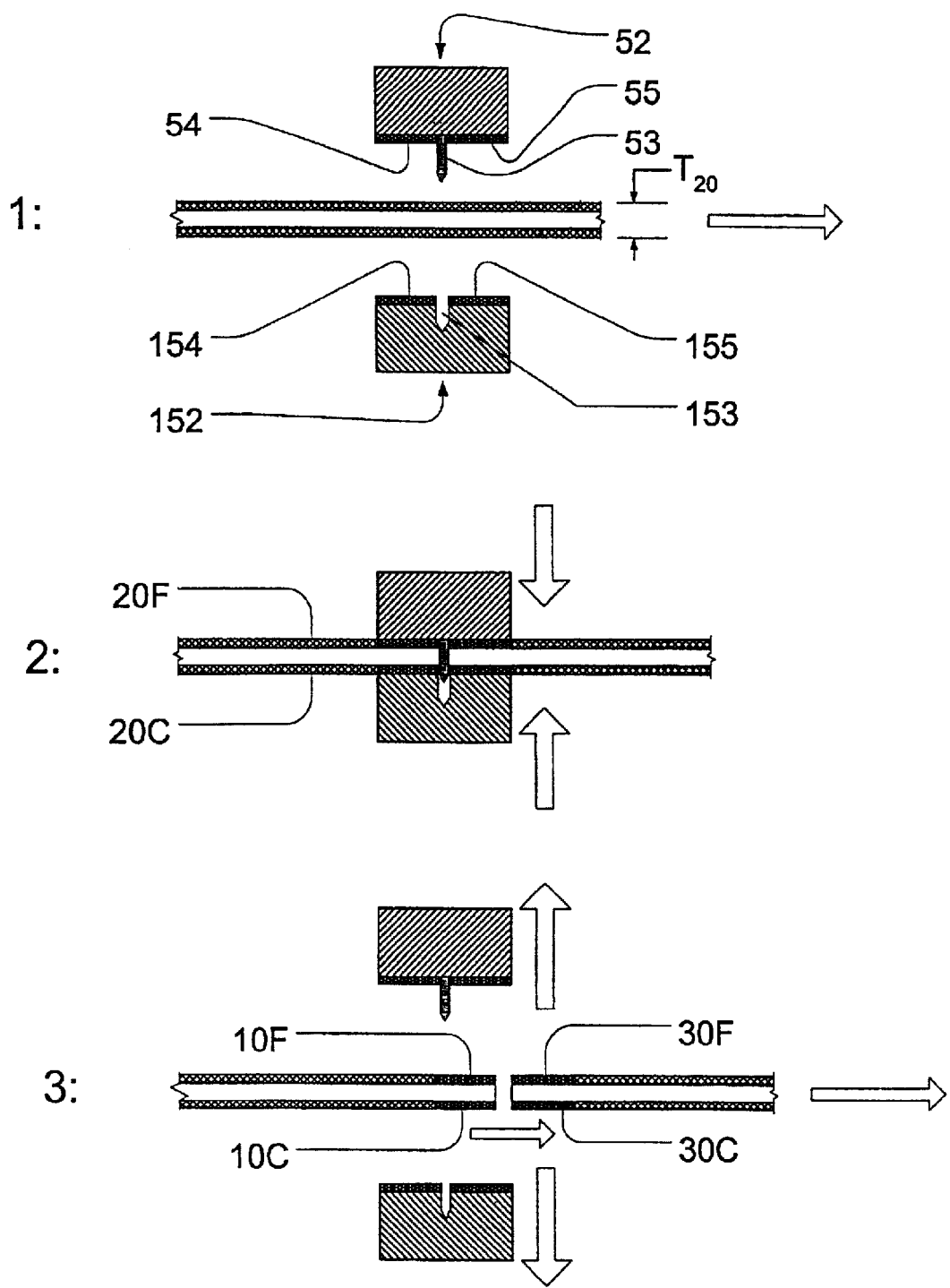
FIGS. 4A, 4B and 4C are schematic representations of a fluid flow field plate being fabricated pursuant to a reciprocal step of an embodiment of the present method.
Figure 4B:
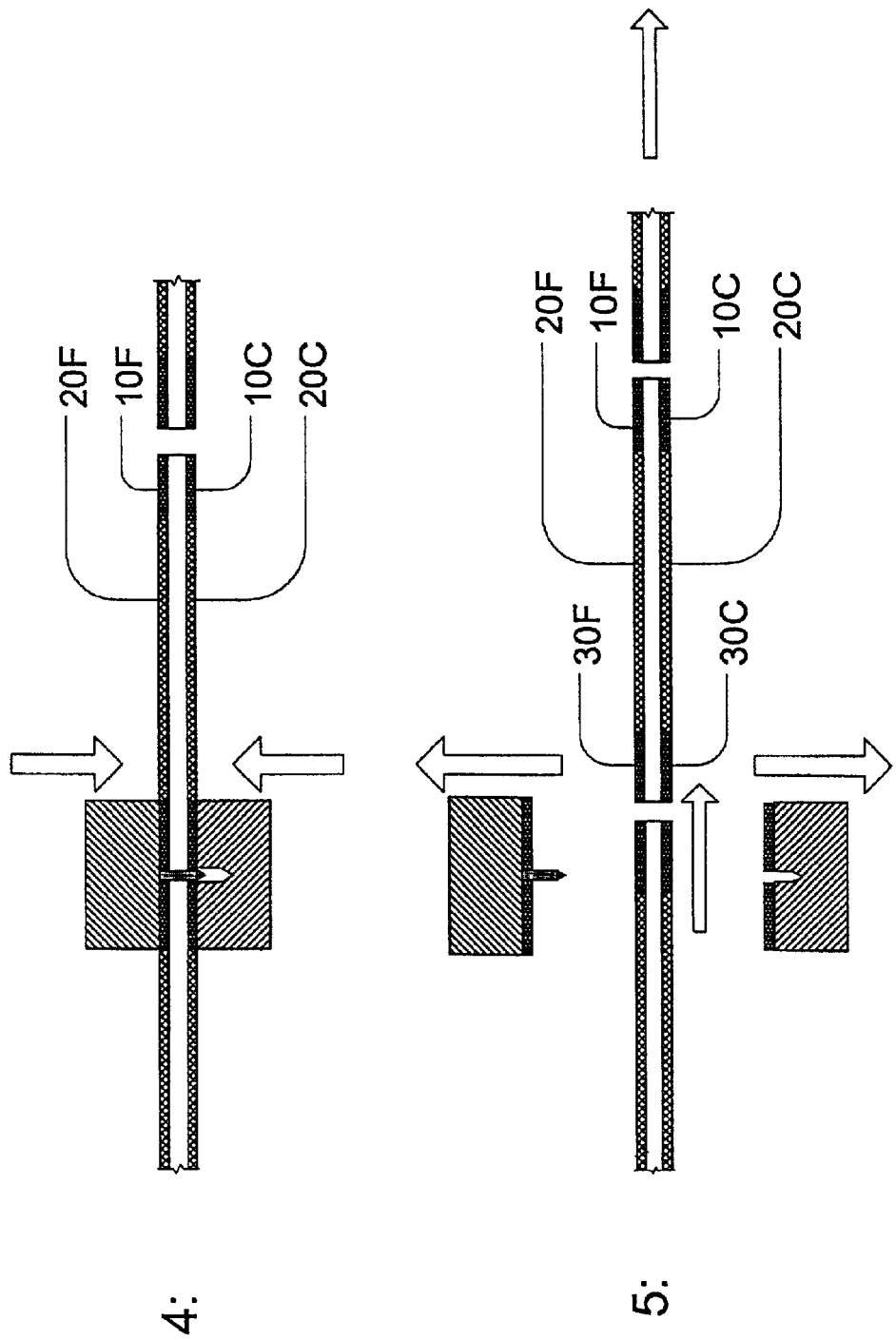
Figure 4C:
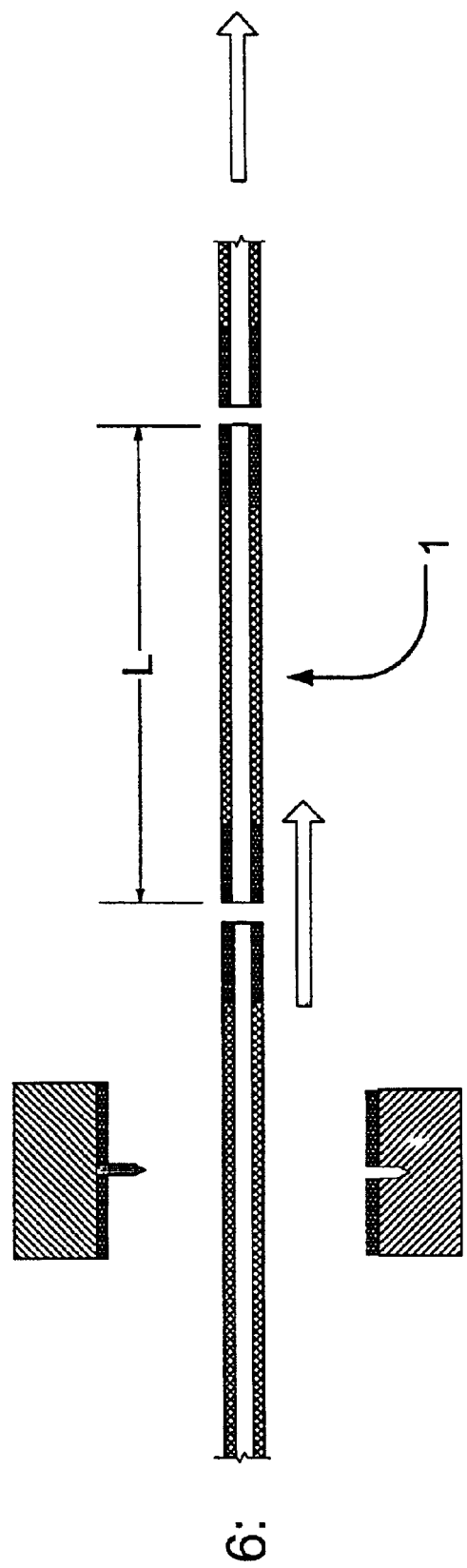

A schematic representation of an embodiment of the reciprocal step of the method is shown in FIGS. 4A, 4B and 4C. The reciprocal embossing step occurs after sheet of material 40 has been roller embossed (that is, after fluid flow field channel regions 20F and 20C have been embossed onto sheet 40 (as shown in part 1 of FIG. 4A)).

As shown in part 1 of FIG. 4A, the reciprocal embossing apparatus comprises reciprocal dies 52 and 152. Reciprocal die 52 comprises a cutter blade 53 and stamping surfaces 54 and 55. In the present embodiment, stamping surface 54 is adapted to emboss leading header region 10F of fuel side of fuel flow field plate 1 in sheet material 40 and stamping surface 55 is adapted to emboss trailing header region 30F of fuel side of fuel flow field plate 1 in sheet material 40. Cutter blade 53 is adapted to cut sheet 40. Reciprocal die 152 comprises a recess 153 and stamping surfaces 154 and 155. In the present embodiment, stamping surface 154 is adapted to emboss leading header region 10C of coolant side of fuel flow field plate 1 in sheet material 40 and stamping surface 155 is adapted to emboss trailing header region 30C of coolant side of fuel flow field plate 1 in sheet material 40. Recess 153 is dimensioned to receive cutter blade 53. Although not explicitly shown, stamping surfaces 54 and 154 are also adapted to cut manifold openings 12, 15 and 16. Similarly, stamping surfaces 55 and 155 are adapted to cut manifold openings 32, 35 and 36.

As shown in part 2 of FIG. 4A, reciprocal dies 52 and 152 simultaneously reciprocally emboss sheet 40. More specifically, stamping surfaces 54 and 154 simultaneously emboss fuel inlet passages 13, coolant inlet passages 17, fuel inlet manifold opening 12, oxidant inlet manifold opening 15 and coolant inlet manifold opening 16 of one fluid flow field plate (that is, leading header region 10F on one side and leading header region 10C on another (see FIGS. 2B and 2D for details on both leading header regions)). Similarly, stamping surfaces 55 and 155 simultaneously emboss fuel outlet passages 33, coolant outlet passages 37, fuel outlet manifold opening 32, oxidant outlet manifold opening 35 and coolant outlet manifold opening 16 of another fluid flow field plate (that is, trailing header region 30F on one side and trailing header region 30C on another (see FIGS. 2B and 2D for details on both trailing header regions)).

As reciprocal dies 52 and 152 simultaneously stamp emboss header region 10 of one fluid flow field plate and trailing header region 30 of an adjacent fluid flow field plate, cutter 53 cuts sheet of material 40 in between (see part 3 of FIG. 4A). As outlined above, variation in length of sheet 40 tends to occur during the roller embossing step, with little appreciable variation in length occurring afterwards. Consequently, reciprocal embossing (and cutting) can occur at every L interval of sheet 40 passing by reciprocal dies 52 and 152, so that a fully formed fuel flow field plate 1 emerges (parts 4–5 of FIG. 4B and part 6 of FIG. 4C).

Pursuant to the method, resin curing of fuel flow field plate 1 occurs subsequently to the reciprocal embossing step of the method.

The present embodiment of the method could, for example, be used to fabricate fluid flow field plates with the following geometric characteristics (see FIGS. 1B and 2A for illustrations of characteristics):

(a) Fuel flow field plate 1:
   Header region lengths $L_{10}$ and $L_{30}$: 60–80 mm range;
   Fuel flow field channel region length $L_{20}$: 500–700 mm range;
   Fuel flow field plate length $L_{10}+L_{20}+L_{30}$: 620–860 mm range;
   Fuel flow field widths $W_{10}$, $W_{20}$ and $W_{30}$: 50–65 mm range;
   Fuel flow field thickness $T_{10}$, $T_{20}$ and $T_{30}$: 0.8–1.3 mm range;
   Pitch $P_{22}$ and $P_{26}$: 1.1–1.6 mm range;
   Fuel flow channel width $W_{22}$: 0.8–1.3 mm range;
   Coolant channel width $W_{26}$: 0.6–1.1 mm range.

(b) Oxidant flow field plate 6:
   Header region lengths $L_{10}$ and $L_{30}$: 60–80 mm range;
   Oxidant flow field channel region length $L_{20}$: 500–700 mm range;
   Oxidant flow field plate length $L_{10}+L_{20}+L_{30}$: 620–860 mm range;
   Oxidant flow field widths $W_{10}$, $W_{20}$ and $W_{30}$: 50–65 mm range;
   Oxidant flow field thickness $T_{10}$, $T_{20}$ and $T_{30}$: 0.6–1.1 mm range;
   Pitch $P_{62}$: 1.1–1.6 mm range;
   Oxidant channel width $W_{62}$: 0.6–1.1 mm range.

Although the present method has been described by way of specific embodiment(s) for purposes of illustration, it will be appreciated that various modifications can be made without deviating from the scope of the present method. For example, a fluid flow field plate can be fabricated pursuant to the method in which widths $W_{10}$ and $W_{30}$ are not approximately equal to fluid flow field channel region width $W_{20}$.

Figure 5A:
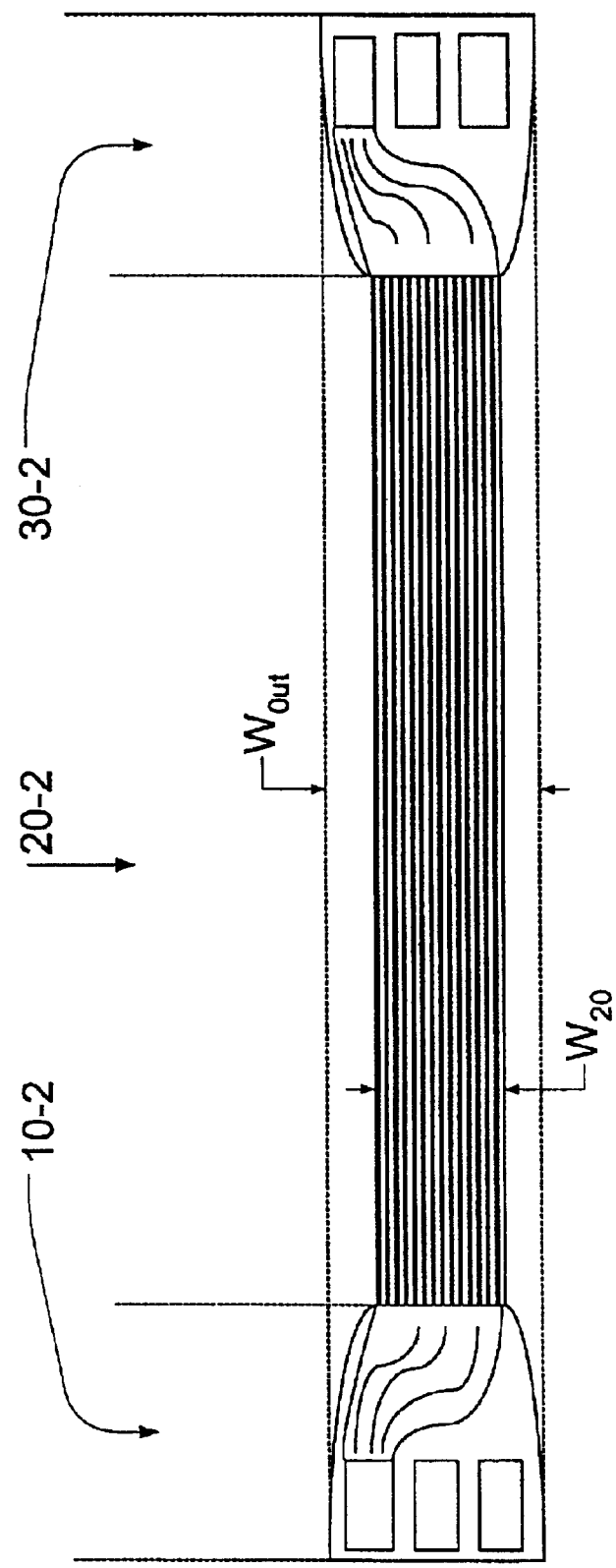
FIGS. 5A, 5B and 5C are plan views of further fluid flow field plates that can be fabricated pursuant to the present method.

FIG. 5A shows a fluid flow field plate where the width of header regions 10-2 and 30-2 exceed the width of fluid flow field channel region 20-2. In this case, the dual-roller embossing apparatus could be adapted so that sheet 40 is embossed to outer width $W_{Out}$. After embossing of header regions 10-2 and 30-2 has been performed, cutting step(s) could be added to narrow down the fluid flow field plate to its desired profile (that is, narrow down fuel flow field channel region 20-2 width to $W_{20}$ and narrow down parts of header regions 10-2 and 10-3 to their desired width profile).

Figure 5B:
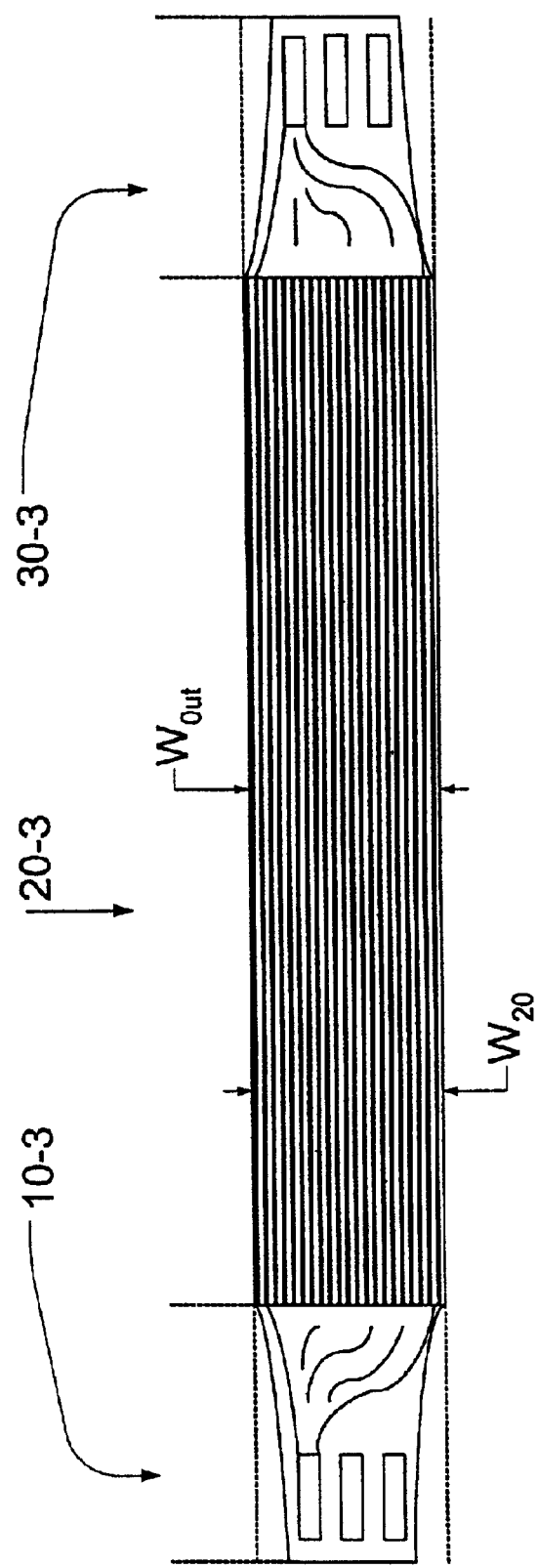

FIG. 5B shows a fluid flow field plate in which the width of header regions 10-3 and 30-3 is less than the width of fluid flow field channel region 20-3. In this case, the dual-roller embossing apparatus could again be adapted so that sheet 40 is embossed to outer width $W_{Out}$. After embossing of header regions 10-3 and 30-3 has occurred, cutting step(s) could be added to narrow down the fluid flow field plate to its desired profile, in this case to narrow down header regions 10-3 and 30-3 to their desired width profile (fuel flow field channel region 20-3 width being already at $W_{20}$).

Figure 5C:
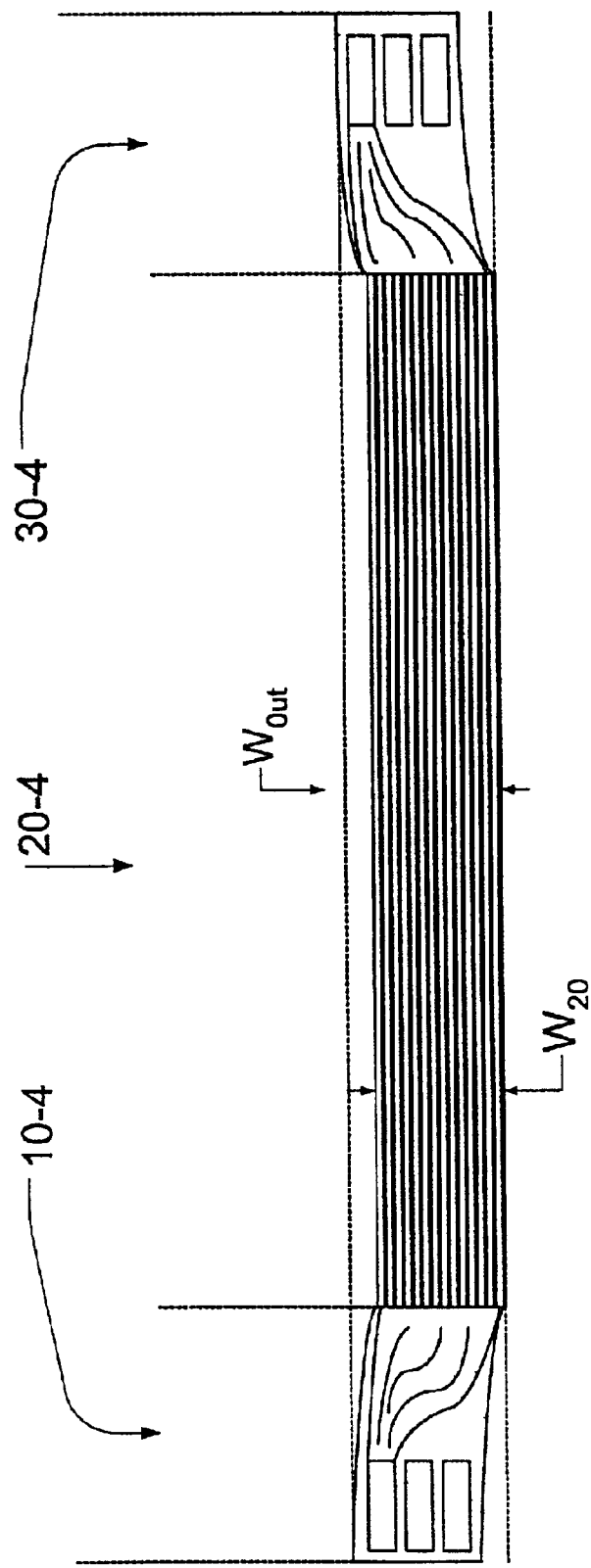

FIG. 5C shows a fluid flow field plate in which header regions 10-4 and/or 30-4 are offset with respect to fluid flow field channel region 20-4. In such a case, the dual-roller embossing apparatus could again be adapted so that sheet 40 is embossed to outer width $W_{Out}$. After embossing of header regions 10-4 and 30-4 has been performed, cutting step(s) could be added to narrow down the fluid flow field plate to its desired profile (that is, narrow down one side of fluid flow field channel region width to $W_{20}$ and narrow down parts of header regions 10-4 and 10-4 to their desired profile).

Figure 5D:
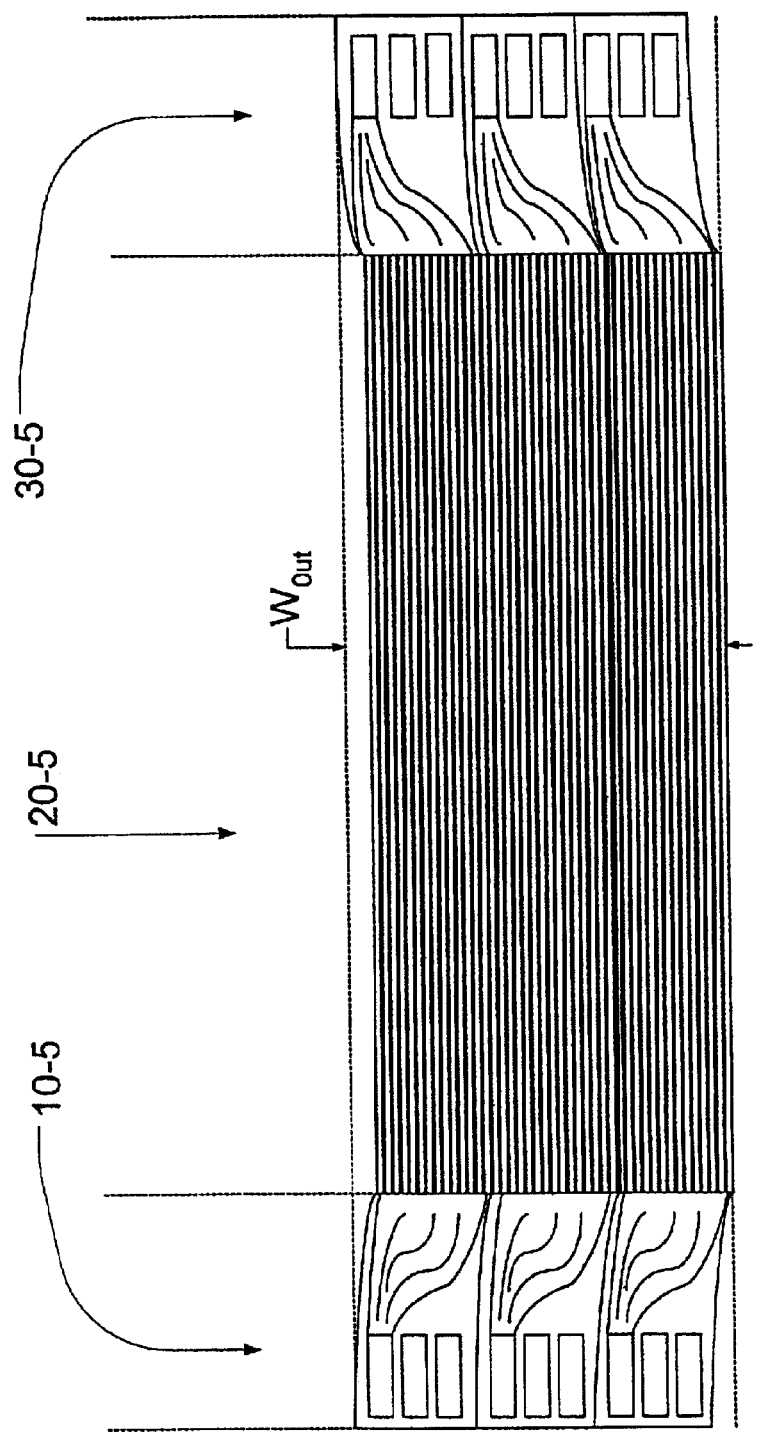

As shown in FIG. 5D, the present method is not limited to fabricating fluid flow field plates end to end. Fluid flow field plates can also be fabricated side by side pursuant to the present method (in the example shown in FIG. 5D, a number of fluid flow field plates in which the header regions are offset with respect to the fluid flow field channel regions are fabricated side by side). In this case, the dual-roller embossing apparatus could again be adapted so that sheet 40 is embossed to outer width $W_{Out}$. After embossing of header regions 10-5 and 30-5 has occurred, cutting step(s) could separate the fluid flow field plates from one another and narrow the plates down to their desired profile.

It is also possible, pursuant to the method, to fabricate fluid flow field plates such as oxidant flow field plate 6. In such an example, roller 41B would have no teeth, as no channels are needed on non-active surface 67 (as seen in FIG. 1A).

Figure 6:
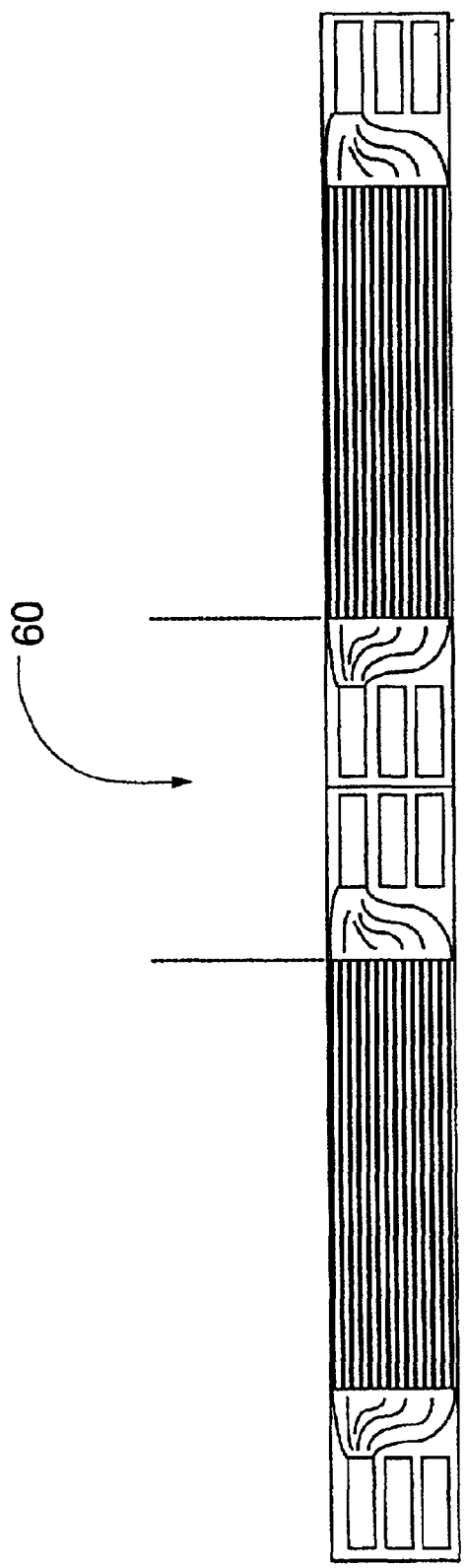
FIG. 6 is a plan view of a further fluid flow field plate that can be fabricated pursuant to the present method.

Fluid flow field plates can also be fabricated pursuant to the present method in which fluid distribution region(s) are positioned elsewhere than at a fluid flow field plate's extremities. For example, FIG. 6 shows an intermediate flow distribution region 60. In this case, further reciprocal dies could be used to emboss region 60 at the proper location after the roller embossing step. Other types of non-flow field channel region(s), such as an intermediate region allowing for the passage of fuel cell stack compression means (for example, tie rods), could also be reciprocally embossed pursuant to this method.

While particular elements, embodiments and applications of the present method and apparatus have been shown and described herein, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A method of fabricating a fluid flow field plate comprising the steps of:

(a) roller embossing a first embossed pattern in a sheet of compressible, electrically conductive material, and then (b) reciprocal embossing a second embossed pattern in the sheet, wherein the first embossed pattern comprises a fluid flow field channel region and the second embossed pattern comprises a fluid distribution region.

2. The method of claim 1, wherein the reciprocal embossing step comprises simultaneously reciprocally embossing a first fluid distribution region of one fluid flow field plate and a second fluid distribution region of another fluid flow field plate.

3. The method of claim 2, wherein the reciprocal embossing step is performed at preset length intervals of the roller embossed sheet material, the preset length equal to the desired length of the fluid flow field plate.

4. The method of claim 2, wherein the reciprocal embossing step further comprises cutting the sheet between the first fluid distribution region of the one fluid flow field plate and the second fluid distribution region of the other fluid flow field plate.

5. The method of claim 4, wherein the reciprocal embossing step is performed at preset length intervals of the roller embossed sheet material, the preset length equal to the desired length of the fluid flow field plate.

6. A method of fabricating a fluid flow field plate comprising the steps of:

(a) roller embossing a first embossed pattern in a sheet of compressible, electrically conductive material, and then (b) reciprocal embossing a second embossed pattern in the sheet, wherein the first embossed pattern comprises fluid flow field channels and the second embossed pattern comprises manifold openings and supply channels.

7. The method of claim 6, wherein the reciprocal embossing step comprises simultaneously reciprocally embossing a first set of manifold openings and supply channels of one fluid flow field plate and a second set of manifold openings and supply channels of another fluid flow field plate.

8. The method of claim 7, wherein the reciprocal embossing step is performed at preset length intervals of the roller embossed sheet material, the preset length equal to the desired length of the fluid flow field plate.

9. The method of claim 7, wherein the reciprocal embossing step further comprises cutting the sheet between the first set of manifold openings and supply channels of the one fluid flow field plate and the second set of manifold openings and supply channels of the other fluid flow field plate.

10. The method of claim 9, wherein the reciprocal embossing step is performed at preset length intervals of the roller embossed sheet material, the preset length equal to the desired length of the flow field plate.

11. A method of fabricating a fluid flow field plate comprising the steps of:

(a) roller embossing a first embossed pattern in a sheet of compressible, electrically conductive material, and then (b) reciprocal embossing a second embossed pattern in the sheet, wherein the first embossed pattern comprises substantially straight, parallel fluid flow field channels and the second embossed pattern comprises a fluid distribution region.

12. The method of claim 11, wherein the reciprocal embossing step comprises simultaneously reciprocally embossing a first fluid distribution region of one fluid flow field plate and a second fluid distribution region of another fluid flow field plate.

13. The method of claim 12, wherein the reciprocal embossing step is performed at preset length intervals of the roller embossed sheet material, the preset length equal to the desired length of the fluid flow field plate.

14. The method of claim 12, wherein the reciprocal embossing step further comprises cutting the sheet between the first fluid distribution region of the one fluid flow field plate and the second fluid distribution region of the other fluid flow field plate.

15. The method of claim 14, wherein the reciprocal embossing step is performed at preset length intervals of the roller embossed sheet material, the preset length equal to the desired length of the fluid flow field plate.

16. A method of fabricating a fluid flow field plate comprising the steps of:
   (a) roller embossing a first embossed pattern in a sheet of compressible, electrically conductive material, and then
   (b) reciprocal embossing a second embossed pattern in the sheet,
wherein the sheet is pre-impregnated with a curable polymeric composition.

17. The method of claim 16, wherein the first embossed pattern comprises a fluid flow field channel region and the second embossed pattern comprises a fluid distribution region.

18. The method of claim 16, wherein the first embossed pattern comprises fluid flow field channels and the second embossed pattern comprises manifold openings and supply channels.

19. The method of claim 16, wherein the first embossed pattern comprises substantially straight, parallel fluid flow field channels and the second embossed pattern comprises a fluid distribution region.

20. The method of claim 16, further comprising curing the pre-impregnated sheet, wherein the curing step is performed after the roller embossing and reciprocal embossing steps.

21. The method of claim 20, wherein the first embossed pattern comprises a fluid flow field channel region and the second embossed pattern comprises a fluid distribution region.

22. The method of claim 20, wherein the first embossed pattern comprises fluid flow field channels and the second embossed pattern comprises manifold openings and supply channels.

23. The method of claim 20, wherein the first embossed pattern comprises substantially straight, parallel fluid flow field channels and the second embossed pattern comprises a fluid distribution region.

24. The method of claim 16, wherein the sheet is expanded graphite sheet material.

25. The method of claim 24, wherein the first embossed pattern comprises a fluid flow field channel region and the second embossed pattern comprises a fluid distribution region.

26. The method of claim 24, wherein the first embossed pattern comprises fluid flow field channels and the second embossed pattern comprises manifold openings and supply channels.

27. The method of claim 24, wherein the first embossed pattern comprises substantially straight, parallel fluid flow field channels and the second embossed pattern comprises a fluid distribution region.

* * * * *